(12) United States Patent
Kim et al.

(10) Patent No.: US 6,898,515 B2
(45) Date of Patent: May 24, 2005

(54) NAVIGATION SYSTEM USING A PAGING CHANNEL AND A METHOD FOR PROVIDING TRAFFIC INFORMATION

(75) Inventors: Jin-Won Kim, Seoul (KR); Kyong-Joon Chun, Seoul (KR); Yoon-Deock Lee, Seoul (KR); Dong-Jun Kum, Anyang-shi (KR); Sun Choi, Seoul (KR)

(73) Assignee: Samsung Electronics Co., Ltd. (KR)

( * ) Notice: Subject to any disclaimer, the term of this patent is extended or adjusted under 35 U.S.C. 154(b) by 72 days.

(21) Appl. No.: 10/653,637

(22) Filed: Sep. 2, 2003

(65) Prior Publication Data

US 2004/0148092 A1 Jul. 29, 2004

(30) Foreign Application Priority Data

Jan. 11, 2003 (KR) ................. 10-2003-0001873

(51) Int. Cl.[7] ................. G08G 1/0968; G01C 21/20
(52) U.S. Cl. ................. 701/201; 701/210; 701/117
(58) Field of Search ................. 701/202, 201, 701/209, 210, 117, 118, 119; 340/995.13, 995.19

(56) References Cited

U.S. PATENT DOCUMENTS

| | | | | |
|---|---|---|---|---|
| 5,809,424 A | * | 9/1998 | Eizenhoefer | 455/456.2 |
| 5,933,100 A | * | 8/1999 | Golding | 340/995.13 |
| 6,216,085 B1 | * | 4/2001 | Emmerink et al. | 701/117 |
| 6,351,647 B1 | * | 2/2002 | Gustafsson | 455/466 |
| 6,421,602 B1 | * | 7/2002 | Bullock et al. | 701/201 |
| 6,526,349 B2 | * | 2/2003 | Bullock et al. | 701/209 |
| 6,532,418 B2 | * | 3/2003 | Chun et al. | 701/209 |
| 6,535,743 B1 | * | 3/2003 | Kennedy et al. | 455/456.1 |
| 6,757,609 B2 | * | 6/2004 | Tsuge et al. | 701/209 |
| 6,807,483 B1 | * | 10/2004 | Chao et al. | 701/210 |

* cited by examiner

*Primary Examiner*—Michael J. Zanelli
(74) *Attorney, Agent, or Firm*—Dilworth & Barrese, LLP

(57) ABSTRACT

A navigation system utilizing a paging channel of a mobile communication service for a navigation apparatus including a mobile communication function is disclosed, which comprises: a BSC-based traffic server for periodically extracting/synthesizing traffic information in an area of a BSC, and then transmitting the traffic information of a peripheral area including the BSC; and a BSC for inserting the traffic information received from the BSC-based traffic server into the paging channel for a mobile communication terminal, and then transmitting it. In the navigation system, traffic conditions information in a corresponding area is transmitted by means of a paging channel, thereby utilizing real time traffic information while maintaining the architecture of the existing mobile communication network without an additional apparatus and communication cost.

13 Claims, 9 Drawing Sheets

| TRAFFIC INFORMATION MANAGEMENT DB OF EACH BSC | (210) |
|---|---|
| BSC_ID | (211) |
| AREA CODE | (212) |
| ADJACENT LINK OF EACH NODE | (213) |
| SPEED OF EACH LINK | (214) |
| TIME INDEX | (215) |

Stt-Message (a)

| MESSAGE BEGIN | BSC ID | AREA CODE | TIME INDEX | THE NUMBER OF NODE |
|---|---|---|---|---|

Info-Message (b)

| NODE BEGIN | NODE ID #1 | THE NUMBER OF ADJACENT LINK M | ADJACENT LINK ID #1 | AVERAGE TRAVEL SPEED | ... | ADJACENT LINK ID #M | AVERAGE TRAVEL SPEED | NODE END |
|---|---|---|---|---|---|---|---|---|
| ... | ... | ... | ... | ... | ... | ... | ... | ... |
| NODE BEGIN | NODE ID #N | THE NUMBER OF ADJACENT LINK L | ADJACENT LINK ID #1 | AVERAGE TRAVEL SPEED | ... | ADJACENT LINK ID #L | AVERAGE TRAVEL SPEED | NODE END |

End-Message (c)

| END M BEGIN | END MESSAGE |
|---|---|

FIG.2C

NAVIGATION SYSTEM USING A PAGING CHANNEL AND A METHOD FOR PROVIDING TRAFFIC INFORMATION

PRIORITY

This application claims priority to an application entitled "Navigation System Using Paging Channel And Method For Providing Traffic Information" filed in the Korean Industrial Property Office on Jan. 11, 2003 and assigned Serial No. 2003-1873, the contents of which are hereby incorporated by reference.

BACKGROUND OF THE INVENTION

1. Field of the Invention

The present invention relates to a navigation system, and more specifically to a navigation system for transmitting real time traffic information by means of a paging channel and searching for an optimal path, in real time, by means of the real time traffic information and a method for providing the traffic information.

2. Description of the Related Art

In general, positional information regarding movable bodies, such as ships, airplanes and vehicles, may be provided to navigation systems. The global positioning system (GPS) position measuring device receives radio signals representing a latitude, a longitude and an altitude, etc., from a plurality of satellites included in the GPS and calculates current positions of movable bodies. Further, the GPS position measuring device displays geographical information, including current positions, on the basis of map data stored in advance. That is, a general navigation system (GNS) provides drivers with various information, necessary for driving, by means of information received from the GPS. For instance, the GNS displays on a screen a current speed of movement, a path of movement set by a driver before driving, and an optimal path to a destination.

Core technologies of a navigation system include a positioning technology for accurately determining a position of the movable bodies and a routing technology for informing a path to a destination. The present invention addresses the latter. In general, a routing is performed by means of a digital map DB, a current position of the movable body and destination information. For the routing, algorithms, such as, a digital Dijkstra algorithm or A* algorithm are utilized.

In order to improve the precision of a routing result of such navigation system, traffic information must be included in the algorithm. Furthermore, when it is considered that the traffic information continuously changes, a continuous update for the traffic information must be performed during the travel of a vehicle.

In general, when a vehicle driver wants a routing that reflects traffic information, the vehicle driver should access a traffic information management server. For example, a connection to the traffic information management server must be performed before the vehicle driver starts toward destination, or according to the needs of a user during traveling of a vehicle, a reconnection to a traffic information management server must be performed, and a path must be received.

FIG. 1 is a block diagram of a navigation system for providing traffic information in a conventional way. In order to utilize real time traffic information during traveling, a navigation terminal 10 must be connected to a traffic server 20. The traffic server 20 obtains traffic information regarding a requested area from a traffic information database (DB) 25 and then provides it to the navigation terminal 10. However, according to this method, in order to provide real time traffic information, a connection between the navigation terminal 10 and the traffic server 20 must be performed. Accordingly, in a case in which path guidance data reflecting traffic information, from an original starting point to a destination, is received and then path guidance is performed by means of the path guidance data, a target road may not have been congested when an original path was actually calculated. However, when a vehicle moves and enters into the target road, severe congestion may have occurred due to change of traffic conditions. To avoid this situation, path guidance data including new traffic information must be received after connecting to the traffic server each time. Accordingly, a traffic information user must bear not only DB charges but also an additional communication cost of utilizing the DB.

Other technologies for transmitting traffic information by means of frequency modulation (FM) additional broadcasting have been developed. However, according to this method, since traffic information of a particular avoidance region or a wide area is transmitted, but traffic information of an area in which a user is driving at present is not transmitted, it is difficult to apply a real time optimal path search by means of traffic information updated with rapid period.

Furthermore, according to the conventional methods using the FM additional broadcasting, additional apparatus for receiving FM additional carrier must be installed. That is, in addition to a portable terminal generally used in navigation or a universal mobile communication means such as a communication module, additional hardware is necessary.

Moreover, in the navigation terminal using traffic information transmitted through the FM additional broadcasting, a real time path calculation can not be performed and only simple text messages are displayed. Accordingly, a driver must see the text messages during traveling, in order to determine and avoid congestion areas, which may be very detrimental to the driver's safety.

SUMMARY OF THE INVENTION

Accordingly, the present invention has been made to solve the above-mentioned problems occurring in the prior art, and it is an object of the present invention to provide a navigation system for searching for an optimal path by means of real time traffic information.

It is another object of the present invention to provide a navigation system capable of collecting real time traffic information without additional cost and maximizing a routing effect by means of collected traffic information.

It is another object of the present invention to provide a navigation apparatus for transmitting real time traffic information by means of a paging channel utilized in a wireless network and searching for an optimal path in real time by means of the real time traffic information and a method for providing the traffic information.

In order to accomplish these objects according to the preferred embodiment of the present invention, there is provided a navigation system utilizing a paging channel of a mobile communication service for a navigation apparatus including a mobile communication function comprising: a base station controller (BSC)-based traffic server for periodically extracting/synthesizing traffic information in an area of the BSC from a traffic information management center which provides a navigation service and manages traffic information for an entire path and then transmitting the traffic information in the area which is controlled by the BSC; and the BSC for inserting traffic information received from the BSC-based traffic server into the paging channel for a mobile communication terminal and then transmitting the paging channel.

In order to accomplish these objects according to the preferred embodiment of the present invention, there is provided a navigation apparatus including a mobile communication function for a navigation system utilizing paging channel of a mobile communication service, the navigation apparatus including a mobile communication function comprising: a paging channel analyzing means for analyzing paging channel transmitted from a base transceiver station (BTS) and determining whether the navigation apparatus has entered a new BSC area or not or whether traffic information has been upgraded or not; a decoding means for decoding the traffic information included in the paging channel for any one of a case in Which the navigation terminal has entered the new BSC area and a case in which the traffic information has been upgraded, on the basis of the analysis result of the paging channel analyzing means; and an optimal path calculation means for calculating an optimal path by means of the traffic information decoded by the decoding means.

In order to accomplish these objects according to the preferred embodiment of the present invention, there is provided a method for searching for an optimal path in real time by mean of a navigation system utilizing paging channel of the mobile communication service comprising the steps of: (1) receiving entire optimal path information for a starting point and a destination and storing the entire optimal path information; (2) receiving paging signals through a BTS, analyzing the paging signals, extracting traffic information included in the paging signals and then storing the extracted information; (3) calculating an optimal path in a corresponding BSC area by means of the extracted traffic information; and (4) when two optimal paths are different from each other after comparing the optimal path in step (3) with the optimal path in step (1), replacing a corresponding part of the optimal path in step (1) with the optimal path in step (3) and then storing the replaced optimal path.

In order to accomplish these objects according to the preferred embodiment of the present invention, there is provided a computer-processable recording medium employed in a navigation system having a processor, the recording medium containing a program comprising the following functions of: (1) receiving entire optimal path information for a starting point and a destination and storing the entire optimal path information; (2) receiving paging signals from a BTS, analyzing the paging signals, extracting traffic information included in the paging signals, and then storing the extracted information; (3) calculating an optimal path in a corresponding BSC area by means of the extracted traffic information; and (4) when two optimal paths are different from each other after comparing the optimal path in step (3) with the optimal path in step (1), replacing a corresponding part of the entire optimal path with the optimal path in the corresponding BSC, and then storing the replaced optimal path.

BRIEF DESCRIPTION OF THE DRAWINGS

The above and other objects, features and advantages of the present invention will be more apparent from the following detailed description taken in conjunction with the accompanying drawings, in which:

FIG. 2c is an exemplary view of a detailed structure of traffic information included in a paging packet according to the present invention;

DETAILED DESCRIPTION OF THE PREFERRED EMBODIMENT

Figure 1:
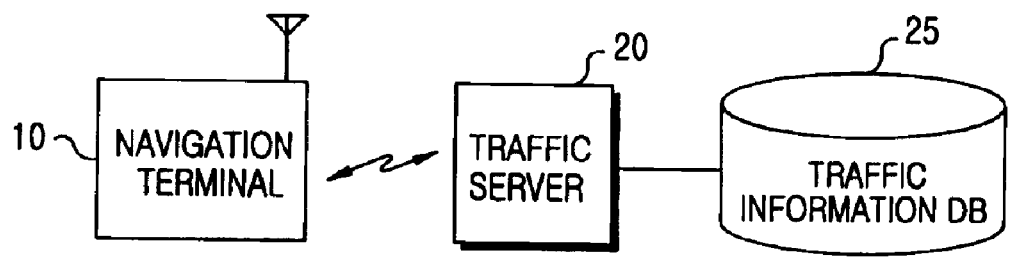
FIG. 1 is a block diagram showing a construction of a navigation system for providing traffic information in a conventional way.

Hereinafter, according to preferred embodiment of the present invention will be described with reference to the accompanying drawings. In the following description and drawings, the same reference numerals are used to designate the same components. In the following description of the present invention, a detailed description of known functions and configurations incorporated herein will be omitted when it may make the subject matter of the present invention rather unclear.

Figure 2:
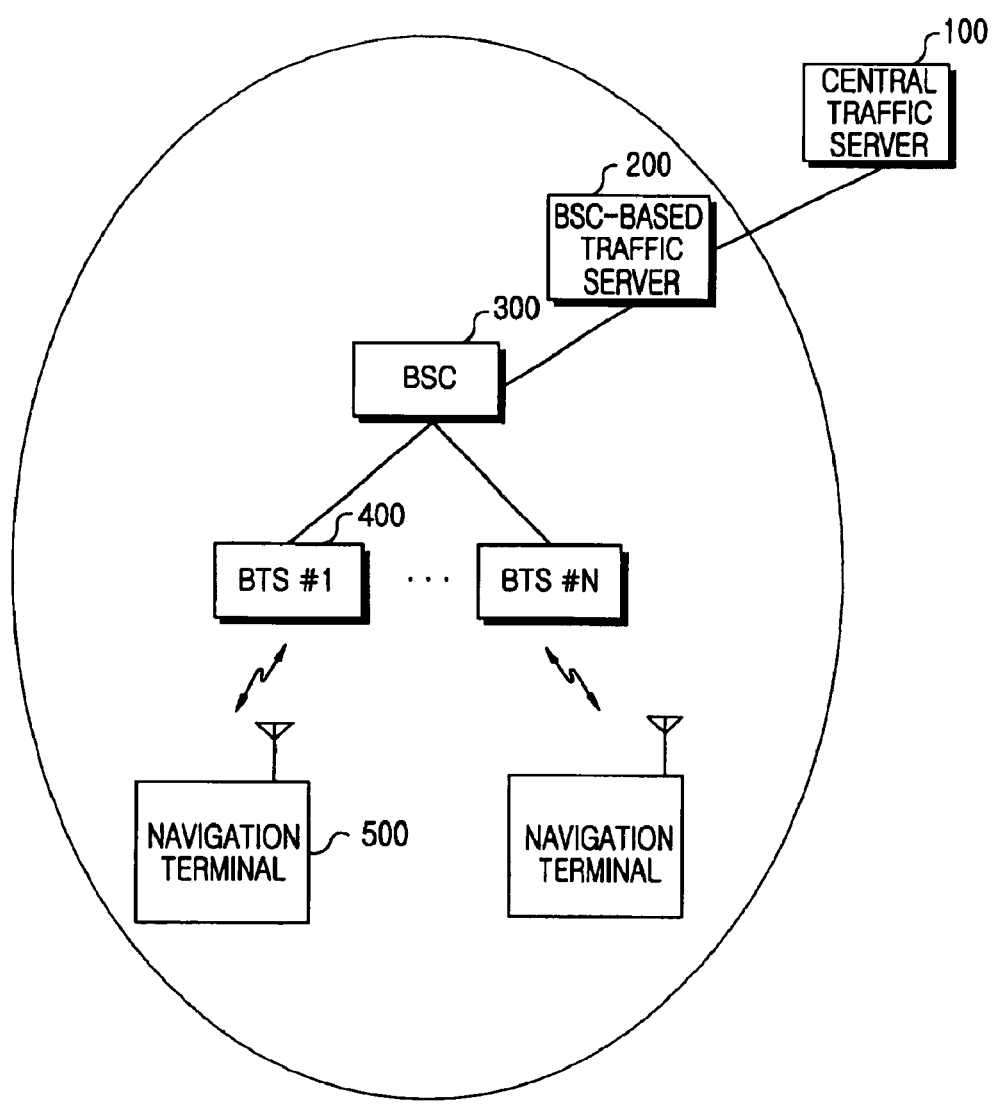
FIG. 2 is a block diagram of one embodiment of a navigation system for providing traffic information by means of a paging channel according to the present invention.

FIG. 2 illustrates one embodiment of a navigation system for providing traffic information by means of a paging channel, including a navigation terminal 500 having communication function for receiving navigation services, base transceiver stations (BTSs), BTS #1 to BTS #N 400 for providing the navigation terminal 500 with information, a base station controller (BSC) 300 for managing the BTSs 400, a BSC-based traffic server 200 for managing traffic information according to the BSC 300 and a central traffic server 100 for periodically extracting traffic information in an area of each BSC 300. The inventive navigation system synthesizes the extracted information and then transmits the synthesized information to respective BSC-based traffic server 200. The BSC-based traffic server 200 may directly collect/manage traffic information of an area without receiving traffic information of the area, which is controlled by the BSC-based traffic server 200 from the central traffic server 100.

The entire operation of the navigation system is described below. The BSC-based traffic server 200 extracts traffic information in an area of the BSC 300 from traffic information transmitted from the central traffic server 100 and synthesizes the extracted information. Then, the BSC-based traffic server 200 transmits traffic information in a peripheral area including a corresponding BSC 300 to the BTSs 400 via the BSC 300. Herein, the BSC 300 includes the transmitted information into a paging channel for mobile terminals and then transmits the paging channel to the BTSs 400.

The BTSs 400 transmits traffic information of a corresponding area, received periodically through paging channel for terminals in a corresponding BTS 400, to the navigation terminal 500. The navigation terminal 500, which has a mobile communication means, decodes the traffic information transmitted through the paging channel and then determines a degree of congestion of traffic on a current path. The navigation terminal 500 recalculates an optimal path and then provides navigation information in which real time traffic information is included.

Figure 7:
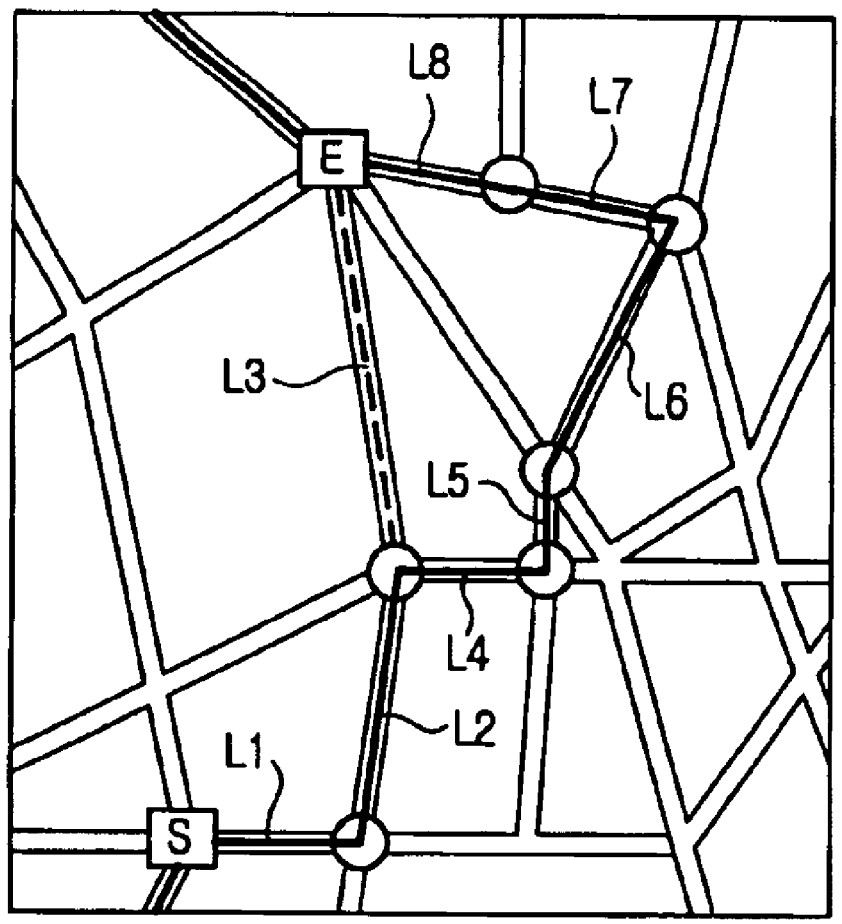
FIG. 7 is an exemplary view of links and nodes in a BSC according to the present invention.

Herein, a statement "the BSC-based traffic server 200 periodically extracts traffic information in an area of the respective BSC 300 and then-synthesizes the extracted information" implies that the BSC-based traffic server 200 extracts an average travel speeds of all links in the area of the respective BSC 300 and then synthesizes the extracted speed. FIG. 7 illustrates links and nodes in a BSC in view of a map in the area, which is controlled by the BSC 300, comprises a plurality of links and nodes, paths of the present invention are searched through these links and nodes. Particularly, in FIG. 7, nodes S, and E marked by a quadrangle, represent a starting point S and an ending point E in a corresponding area. Parts L1 to L8 marked by a thick line represent paths searched as an optimal path from the starting point S and the ending point E. From among the paths, path L3 marked by a thick broken line represents a path which has been initially found as an optimal path, but which has been canceled on the basis of traffic information according to the BSC 300 (FIG. 2). That is, in an example of FIG. 7, an optimal path from a starting point S to an ending point E has been selected in a sequence of L1, L2, and L3, while the part L3 is determined as a congestion area on the basis of traffic information according to the BSC. Then, an optimal path excluding the path L3 is again searched. As a result of the search, the optimal path from the starting point S to the ending point E is selected in a sequence of L1, L2, L4, L5, L6, L7, and L8.

According to the present invention, in contrast with a conventional navigation reflecting traffic information by means of only the central traffic server 100, traffic information servers according to corresponding areas are provided at the respective BSC 300 in mobile communication service system, and real time traffic information according to areas are transmitted. An example of a database structure 210, included in the BSC-based traffic server 200, for managing the traffic information according to the BSC is shown in FIG. 2a.

Figures 2A, 2B:
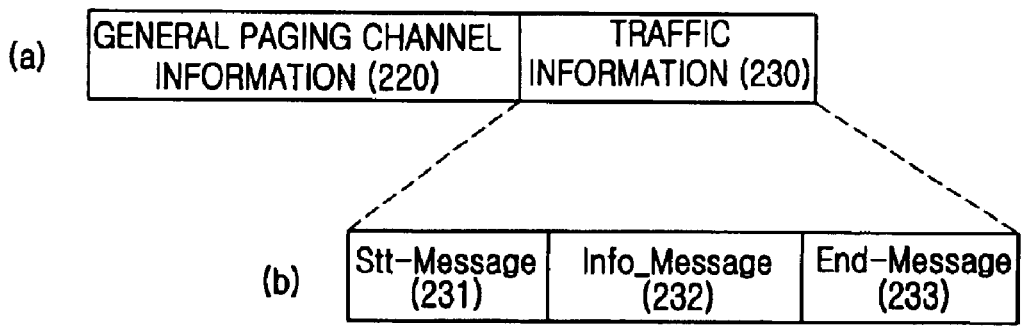
FIG. 2a is an exemplary view of a structure of a database included in the BSC-based traffic server for managing the traffic information according to the present invention.
FIG. 2b is an exemplary view of a paging message packet for transmitting traffic information according to one embodiment of the present invention.

In consideration of the traffic information managed by the BSC-based traffic server 200 with reference to FIG. 2a, the traffic information managed by the BSC-based traffic server 200 includes an identifier (ID) 211 of a corresponding BSC 300, an area code 212 of the corresponding BSC 300, adjacent links 213 according to nodes included in the corresponding BSC 300, speeds 214 according to links included in the corresponding BSC 300 and time information Time Index 215 collecting corresponding traffic information.

In order to transmit the traffic information in the corresponding BSC 300 area, managed as described above to the navigation terminal 500 having communication function, paging packet shown in FIG. 2b is utilized. That is, a traffic information 230 field is included in a field representing a general paging channel information 220. The traffic information field includes an Stt_Message representing a start of the traffic information, an Info_Message representing the traffic information, and an End_Message representing an end of traffic information. When paging is performed, the paging packet is transmitted by the navigation terminal 500 having communication function.

A detailed structure of the Stt_message 231, Info_message 232, and End_message 233 included in the traffic information field 230 is shown in FIG. 2c. As shown, the Stt_message (a) includes a Message Begin field for informing a start of a message, a BSC ID field, an area code field for an area which is controlled by a corresponding BSC, a Time Index field for storing collection time information of corresponding traffic information and a node number field for storing the number of nodes in a corresponding area.

The Info_message (b) includes as many rows as the number of nodes in a BSC area and includes a Node Begin field for informing a start of a node, a Node ID field, an adjacent link number field of a corresponding node. Further, the Info_message (b) includes a link ID field of each adjacent link in accordance with the number of a corresponding link of the adjacent link number field and an average travel speed field in an adjacent link. Herein, the Info_message (b) may further include a BSC ID field and a Time Index field for storing collection time information of corresponding traffic information, thereby determining the BSC area to which the received traffic information belongs and determining time information in which the traffic information has been generated, even if the corresponding traffic information has been received from the middle of the corresponding traffic information.

The End_message (c) includes an End_M Begin field for informing a start of an End_message and a Message End field for informing an end of a message.

Figure 3:
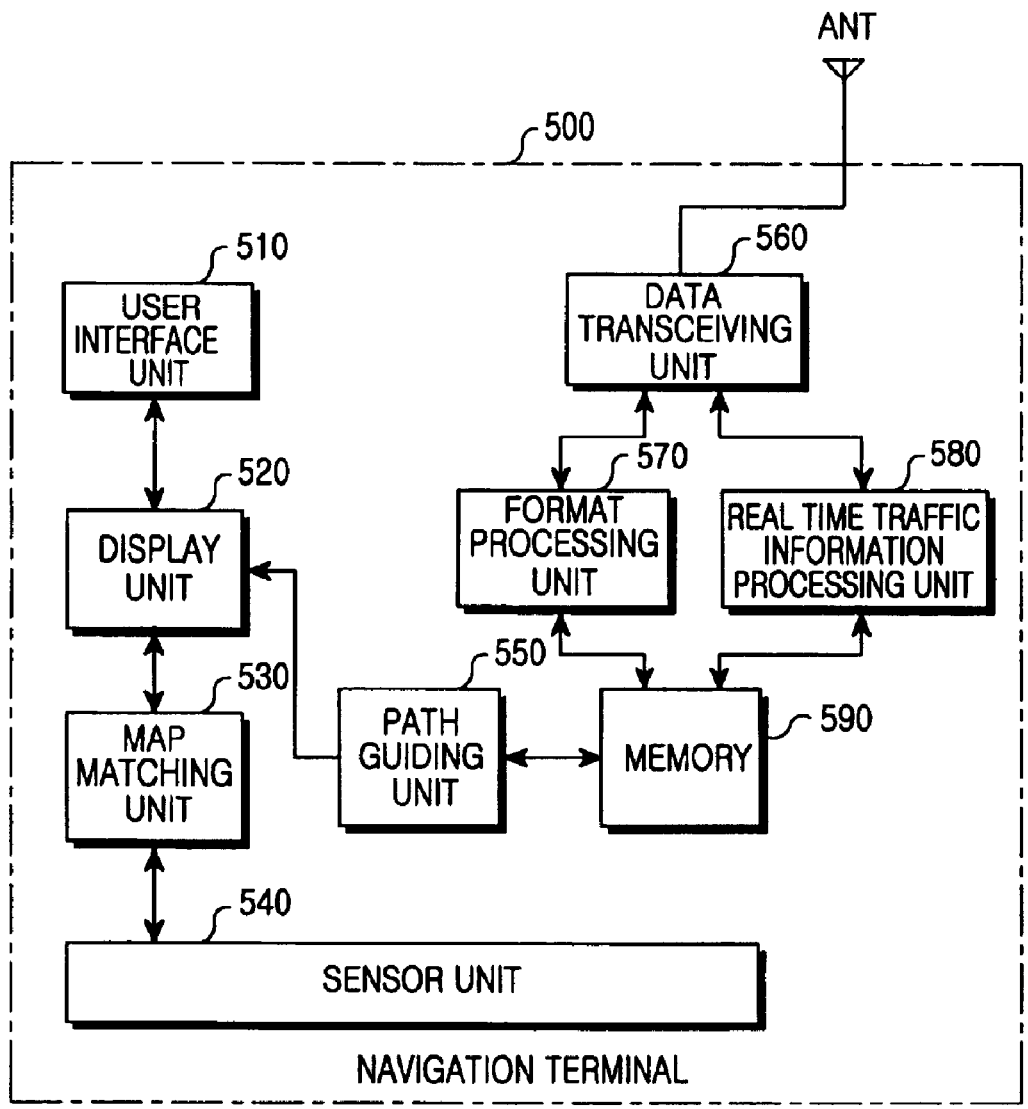
FIG. 3 is a block diagram of one embodiment of a navigation terminal according to the present invention.

FIG. 3 shows one embodiment of a navigation terminal according to the present invention. The navigation terminal according to the present invention includes a user interface section 510, a display section 520, a map matching section 530, a sensor section 540, a path guiding section 550, a data transceiving section 560, a format processing section 570, a real time traffic information processing section 580, and a memory 590.

In order to receive path guidance, the user inputs user requirements, such as selecting a navigation function mode, and setting a current position and a destination in the navigation function mode, through the user interface section 510. The display section 520 displays a map, a destination and a path, etc., in accordance with performance of navigation functions. The data transceiving section 560 generates/transmits signals suitable for a wireless network and receives signal from the wireless network. The format processing section 570 converts data into a format set in advance in agreement with a traffic server, which manages a wireless network and traffic information. The format processing section 570 interprets signals received in the data transceiving section 560 according to the promised format and converts the interpreted signals into data. The path guiding section 550 processes path guidance data for performing path guidance function. The sensor section 540 extracts various data necessary in understanding a current position of a necessary vehicle for navigation function.

The map matching section 530 displays a current position of a moving vehicle at a corresponding point on a map. The map matching section 530 compares the path guidance data received from the traffic server with position data received in the sensor section 540, thereby understanding a movement state of a vehicle at a current point. The real time traffic information processing section 580 analyzes the traffic information transmitted from the BSC, thereby searching real time optimal paths for a corresponding BSC area.

Figure 4:
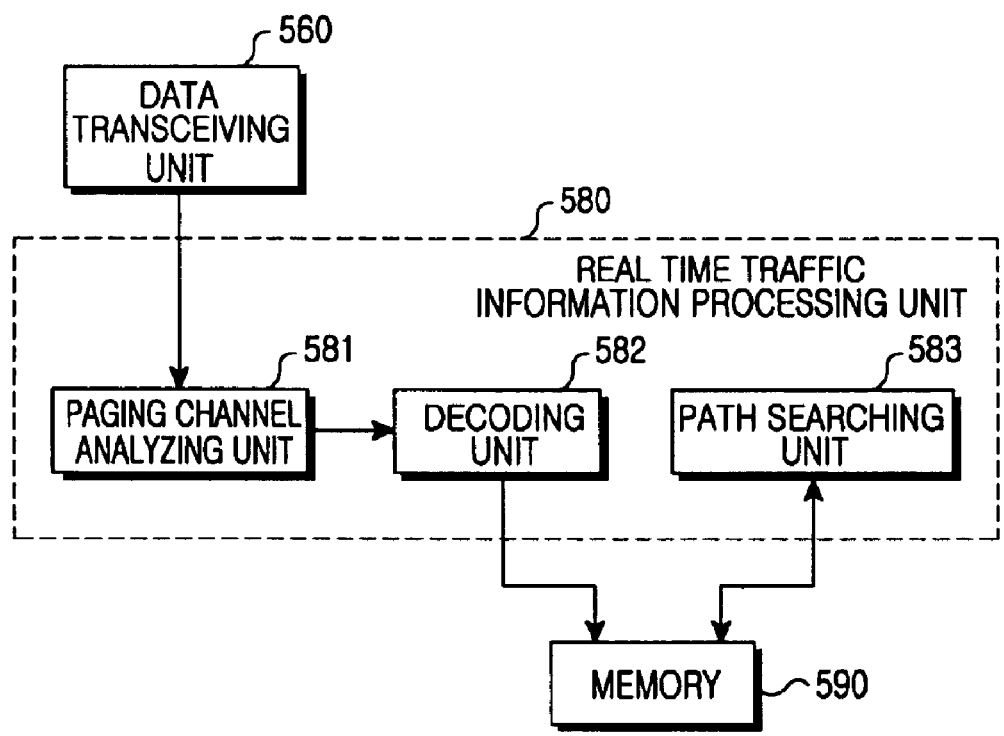
FIG. 4 is a block diagram of a real time traffic information processing section of a navigation terminal of the present invention.

FIG. 4 is a block diagram showing a detailed construction of a real time traffic information processing section 580 of a navigation terminal according to the present invention. The real time traffic information processing section 580 includes a paging channel analyzing section 581, a decoding section 582, and a path searching section 583. The paging channel analyzing section 581 analyzes a paging channel transmitted from a BTS and then divides it into paging information and traffic information. Further, the paging channel analyzing section 581 determines whether the navigation terminal has entered a new BSC area or not or whether the traffic information has been upgraded or not. The decoding section 582 decodes the traffic information included in the paging channel for any case in which the navigation terminal have entered the new BSC area and a case in which the traffic information has been upgraded, on the basis of the analysis result of the paging channel analyzing section 581 and then stores the decoded information in the memory 590. The path searching section 583 searches an optimal path by means of the traffic information stored in the memory 590 and the traffic information decoded by the decoding section 582 and then transmits the search result to the memory 590.

Figure 5:
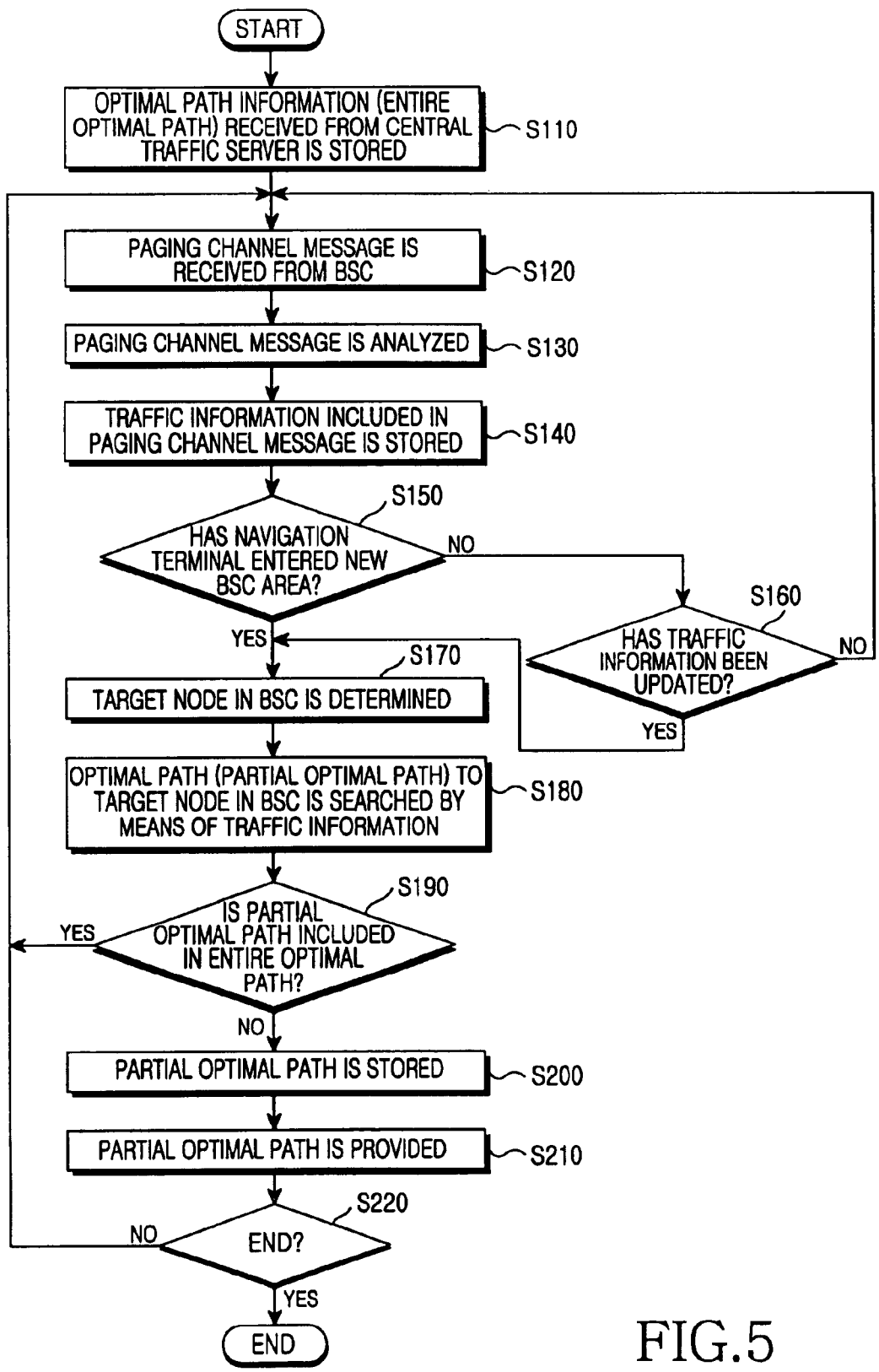
FIG. 5 is a flow chart of a first embodiment of a method for searching for a path in real time in a navigation terminal according to the present invention.

FIG. 5 is a flow chart illustrating a first embodiment of a method for searching for a path in real time in a navigation terminal according to the present invention. First, an optimal path received from a central traffic server is stored in step S110. Herein, the optimal path implies the entire optimal path including traffic information from a starting point to a destination when an original path is calculated. The navigation terminal performs path guidance by means of the stored optimal path. Further, a paging channel message, which is basically provided by communication modules or portable terminals of a mobile communication service, are received in step S120. Then, the paging channel message is analyzed in step S130 and then traffic information message included in the paging channel message is extracted in step S130. Herein, the traffic information message is included in the paging channel received through a BTS from a BSC. The traffic information included in the paging channel message is decoded and then is stored in step S140.

BSC IDs included in the paging channel message are compared with each other, so that whether or not a navigation terminal has entered an area controlled by a new BSC is determined in step S150. As a result of the determination in step S150, when the navigational terminal has not entered the area controlled by a new BSC, whether or not the traffic information has been newly updated is first determined by means of a Time index in step S160. For instance, when the Time index information has changed, it is determined that the traffic information has been newly updated.

When the navigational terminal has entered the new area in step S150, or when the traffic information has been updated in step S160, target nodes in a corresponding BSC area are determined on the basis of path information already stored in a memory in step S170, and an optimal path from a current position to the target nodes is calculated by means of the traffic information in step S180. Herein, the optimal path is a partial optimal path different from the optimal path in step S110.

Next, whether or not the partial optimal path in step S180 is agreed with the entire optimal path already stored in the memory in step S110 is determined in step S190. As a result of the determination in step S190, when the partial optimal path is not agreed with the entire optimal path, the newly calculated optimal path is stored in the memory in step S200 and then the new path is provided to a user in step S210. When the partial optimal path is agreed with the entire optimal path, step S120 is performed. Herein, it is self-evident that the optimal path information stored in the memory may be a partial optimal path before the traffic information has been updated. Further in step S220, the paging channel message is continually received until the user arrives at an initially set destination, thereby repeating then steps S120 to S210.

Figure 6:
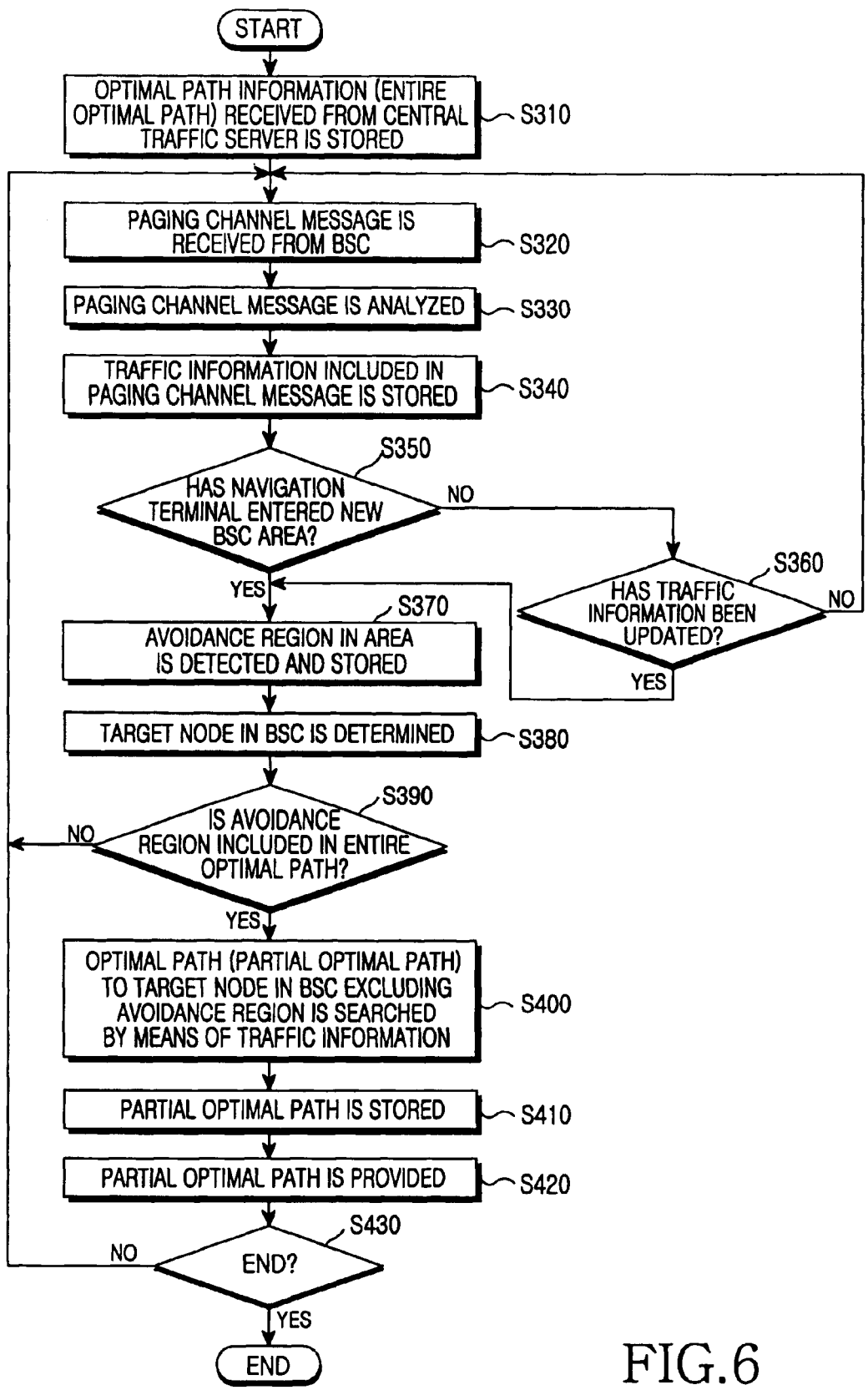
FIG. 6 is a flow chart of a second embodiment of a method for searching for a path in real time in a navigation terminal according to the present invention.

FIG. 6 is a flow chart illustrating a second embodiment of a method for searching for a path in real time in a navigation terminal according to the present invention. First, an optimal path received from a central traffic server is stored in step S310. Herein, the optimal path implies an entire optimal path from a starting point to a destination. Further, paging channel message, which is basically provided by communication modules or portable terminals of a mobile communication service, are received in step S320. The paging channel message is analyzed in step S330 and then traffic information message included in the paging channel message is extracted in step S330. Herein, the traffic information message is included in the paging channel received through a BTS from a BSC. The traffic information included in the paging channel message is decoded and stored in step S340.

BSC IDs included in the paging channel message are compared with each other, so that whether or not a navigation terminal has entered an area controlled by a new BSC is determined in step S350. As a result of the determination in step S350, when it has not entered the area controlled by a new BSC, whether or not the traffic information has been newly updated is first determined by means of a Time index in step S360. Further, when it has entered the new area in step S350 or when the traffic information has been updated in step S360, an avoidance region in a corresponding BSC area, which is a link having an average travel speed below a congestion determination speed defined in advance, is detected and stored in step S370. Herein, the criterion for an avoidance region may be an average travel speed as described above, but when the traffic information includes information regarding the kinds of road and road width, the criterion for an avoidance region may be a result generated by combining the kinds of road, the road width and the average travel speed. That is, when the result generated by combining the kinds of road, the road width and the average travel speed does not meet a criterion set in advance, it may be judged as an avoidance region.

Target nodes in a corresponding BSC area are determined on the basis of path information already stored in a memory in step S380, and then whether or not an avoidance region is included in the optimal path stored in step S310 is confirmed in step S390. As a result of the confirmation in step S390, when an avoidance region is not included in the optimal path stored in step S310, step 320 is performed. Also, when the avoidance region is included in the optimal path stored in step S310, an optimal path to a destination in a BSC excluding an avoidance region is searched by means of the traffic information in step S400. Herein, the optimal path is a partial optimal path different from the optimal path in step S310. The newly searched partial optimal path is stored in the memory in step S410 and then the partial optimal path is provided to a user in step S420. Further on step S430, the paging channel message is continually received until the user arrives at an initially set destination, thereby repeating the steps S320 to S420.

However, when a path search is always performed by means of real time traffic information, it may be sometimes impossible to perform corresponding steps according to performance of a navigation terminal. In this case, the second embodiment of the present invention employs a congestion area avoiding path search algorithm, which can exclude only links, each having an average travel speed below a congestion determination speed defined in advance.

The method of the present invention as described above can be implemented in software and then stored in recording media, such as a CD ROM, a RAM, a floppy disk, a hard disk, and a magneto-optical disk in a computer-processable type.

According to the present invention as described above, traffic conditions in an area in which a vehicle is driving are understood in real time and then are applied for path search, thereby maximizing a routing effect of a navigation system. Particularly, traffic conditions in a corresponding area are transmitted by means of paging channel, thereby utilizing real time traffic information while maintaining the architecture of the existing mobile communication network without an additional apparatus and communication cost. Further, an optimal path to a destination is recalculated on the basis of the real time traffic information and then is provided to users, thereby maximizing navigation functions.

While the invention has been shown and described with reference to certain preferred embodiments thereof, it will be understood by those skilled in the art that various changes in form and details may be made therein without departing from the spirit and scope of the invention as defined by the appended claims.

What is claimed is:

1. A navigation system utilizing a paging channel of a mobile communication service for a navigation apparatus including a mobile communication function, the navigation system comprising:
    a BSC-based traffic server for periodically extracting/synthesizing traffic information in an area of a BSC and then transmitting the traffic information in the area which is controlled by the BSC; and
    a BSC for inserting the traffic information received from the BSC-based traffic server into the paging channel for a mobile communication terminal and then transmitting the paging channel.

2. The navigation system as claimed in claim 1, wherein the traffic information is information in which an average travel speed of all links in the area of the BSC, which is divided into nodes and links between respective nodes, is extracted and synthesized.

3. The navigation system as claimed in claim 1, wherein the paging channel for the mobile communication terminal includes a field representing paging channel information for a general mobile communication and a traffic information field including a Stt_Message representing a start of the traffic information, a Info_Message representing the traffic information and an End_Message representing an end of the traffic information.

4. The navigation system as claimed in claim 3, wherein the Stt_Message includes a Message Begin field for informing a start of a message, a BSC ID field, an area code field for an area which is controlled by a corresponding BSC, a Time Index field for storing collection time information of corresponding traffic information and a node number field for storing the number of nodes in a corresponding area.

5. The navigation system as claimed in claim 3, wherein the Info_message exists as many as the number of nodes in the BSC area and includes a Node Begin field for informing a start of a node, a Node ID field, an adjacent link number field of a corresponding node, an adjacent link ID field for all links adjacent to a corresponding node and an average travel speed field in a corresponding link.

6. The navigation system as claimed in claim 3, wherein the End_message includes an End_M Begin field for informing a start of an End_message and a Message End field for informing an end of a message.

7. A navigation apparatus including a mobile communication function for a navigation system utilizing a paging channel of a mobile communication service, the navigation apparatus including a mobile communication function comprising:
    a paging channel analyzing means for analyzing a paging channel transmitted from a BTS and determining whether the navigation apparatus has entered a new BSC area or whether traffic information has been upgraded;
    a decoding means for decoding the traffic information included in the paging channel for any one of a case in which the navigation terminal has entered the new BSC area and a case in which the traffic information has been upgraded, on the basis of the analysis result of the paging channel analyzing means; and
    an optimal path calculation means for calculating an optimal path by means of the traffic information decoded by the decoding means.

8. The navigation apparatus as claimed in claim 7, wherein the optimal path calculation means calculates the optimal path according to links in a BSC by means of the traffic information, thereby providing the calculated optimal path.

9. The navigation apparatus as claimed in claim 7, wherein the optimal path calculation means determines a degree of congestion of traffic on a current path by means of the traffic information, and determines whether there exists an avoidance region which has an average speed below a predetermined speed set in advance, thereby providing an optimal path.

10. A method for searching for an optimal path in real time by means of a navigation system utilizing a paging channel of a mobile communication service, the method comprising the steps of:
    (1) receiving entire optimal path information for a starting point and a destination and storing the entire optimal path information;
    (2) receiving paging signals through a BTS, analyzing the paging signals, extracting traffic information included in the paging signals, and then storing the extracted information;
    (3) when the extracted traffic information is updated traffic information, calculating an optimal path in a corresponding BSC area by means of the updated traffic information; and
    (4) replacing a corresponding part of the optimal path in step (1) with the optimal path in step (3), and then storing the replaced optimal path.

11. The method as claimed in claim 10, wherein step (3) comprises:
    (3-1) determining a target node in the corresponding BSC area; and
    (3-2) searching for a partial optimal path to the target node by means of the traffic information.

12. The method as claimed in claim 10, wherein step (3) comprises:
    (3-1) determining a target node in the corresponding BSC area;
    (3-2) confirming whether an avoidance region, which has an average speed below a predetermined speed set in advance, exists in the optimal path stored in step (1); and (3-3) as a result of confirmation in step (3-2), searching for a partial optimal path to the target node when the avoidance region exists, and employing the optimal path, which has been stored in step 1, as the partial optimal path to the target node when the avoidance region does not exist.

13. A computer-processible recording medium employed in a navigation system having a processor, the recording medium containing a program, the program comprising the following functions of:

(1) receiving entire optimal path information for a starting point and a destination and storing the entire optimal path information;

(2) receiving paging signals from a BTS, analyzing the paging signals, extracting traffic information included in the paging signals, and then storing the extracted information;

(3) when the extracted traffic information is updated traffic information, calculating an optimal path in a corresponding BSC area by means of the updated traffic information; and (4) replacing a corresponding part of the entire optimal path with the optimal path in the corresponding BSC and then storing the replaced optimal path.

* * * * *